United States Patent Office 2,945,820
Patented July 19, 1960

2,945,820
PRODUCTION OF EXFOLIATED VERMICULITE

George E. Ziegler, Evanston, Ill., assignor to Zonolite Company, Chicago, Ill., a corporation of Montana No Drawing. Filed Jan. 3, 1957, Ser. No. 632,275

3 Claims. (Cl. 252—378)

The present invention relates to the production of exfoliated vermiculite, and particularly, to an improved process of producing exfoliated vermiculite.

Vermiculite is a micaceous mineral, chemically identified as a hydrated magnesium-aluminum-iron silicate, with a platelet-like structure which exfoliates or expands when heated or subjected to certain chemical processes. The mineral occurs naturally in an unexpanded state and is mined in conventional manners. The mined ore is milled to controlled sizes and then exfoliated. Exfoliation is generally accomplished by dropping the milled ore in a continuous stream through a furnace, the chamber temperature of which has variously been reported in ranges from about 1400 to 2200° F., depending on the design of furnace and the burners, and on the location and type of temperature measuring means. During exfoliation, each granule or particle of vermiculite expands to several times its original size and traps within itself thousands of air cells.

Exfoliated vermiculite in each of its sizes or grades has a wide variety of applications, including among others, use as a thermal insulator, sound deadener, soil and fertilizer conditioner, plant propagating medium, plaster and concrete aggregate, carrier for chemicals, and so on. Considerable effort has been expended in endeavors to render exfoliated vermiculite optimumly suited for the numberless uses to which the same is apparently applicable and for which the material has been suggested. However, objections have been raised to the particular behavior or performance of vermiculite under conditions encountered in recommended uses thereof, and also with respect to variable behavior or performance of an allegedly standard grade of vermiculite under a given set of conditions.

The general object of the present invention is to provide an improved process of producing exfoliated vermiculite whereby exacting standards of the resulting product may be consistently and accurately adhered to.

It has been known heretofore that the bulk density of expanded or exfoliated vermiculite diminishes as the temperature of expansion is increased until a level is reached after which there is practically no further reduction in density. It has also been known that the friability, that is the tendency of the expanded vermiculite to be subject to mechanical break down in handling, increases with increasing temperature of expansion. The higher density and the lower friability have led to the general belief that stronger material is obtained at lower temperatures of expansion. From this, it was the natural conclusions that vermiculite expanded at the lowest practical furnace temperature consistent with economic yield would be best suited for substantially all uses. However, as thus produced, the exfoliated product was not particularly strong or stable and the quality and properties thereof have not been consistent.

In contrast to the conclusions and practices of the prior art, I have discovered that the stability of exfoliated vermiculite increases with increased temperature of expansion, and that furnace temperature alone is not an accurate gauge of the product being produced, the discrepancies in the recommended ranges of furnace chamber temperature clearly exhibiting the non-definitive nature thereof. In particular, I have discovered certain basic characteristics of exfoliated vermiculite which, I conceived, may be employed as control criteria to produce exfoliated vermiculite consistently to exacting specifications and to impart to the exfoliated product a wide variety of physical properties for different uses. According to my invention, exfoliation to produce vermiculite meeting predetermined specifications is accomplished by appropriate variable control of the actual temperature at which exfoliation takes place. In regard to the variability of the control, it is to be observed that the properties and moisture content of vermiculite ores, even from the same mine, may vary quite widely, and that prevailing conditions in the exfoliating furnace may also vary. These variables must be compensated for during exfoliation if exacting standards are to be maintained. Thus, furnace temperature must be variable to produce a product of given characteristics and cannot be employed as the sole criteria of production control as has heretofore been the case. Relative to a basic standard of production control, I have found that the end characteristics of the product can be accurately and conveniently determined by controlling exfoliation to produce products having certain percentages of shrinkage; this being in accordance with my said discovery that the physical properties of exfoliated vermiculite, irrespective of the run of ore, vary in substantially fixed relation to the percent shrinkage of the exfoliated product after one or more wetting and drying cycles, and the further discovery that the percent shrinkage bears a definite and fairly constant relationship to the actual temperature of exfoliation, that is, the temperature inside a particle of vermiculite during exfoliation, as contrasted to furnace chamber temperature. While the actual temperature of exfoliation to produce vermiculite having a given percentage of shrinkage may vary somewhat for various runs and grades of ores, the relationship between shrinkage and temperature is very nearly a straight line function, so that the proper temperature to obtain a given or standard percent of shrinkage may readily be determined.

One object of the present invention, therefore, is to provide an improved process of producing exfoliated vermiculite wherein the percent shrinkage of the vermiculite being exfoliated is determined and the furnace adjusted to heat the vermiculite to an exfoliating temperature at which vermiculite having a given or predetermined percent shrinkage will be produced.

Since temperature control may conveniently be effected on a continuous basis, whereas percent shrinkage determinations can be made practically at only periodic intervals, I prefer to control my improved exfoliation process normally as a function of the temperature of exfoliation with frequent critical checks on the accuracy of the control. In this connection, I have determined that the temperature of the discharging stream of exfoliated vermiculite in a continuous exfoliation process is equal substantially to the actual temperature of exfoliation and that temperature measurements made of the stream are not subject to error consequent upon the variable factors involved, such as the time of heating, the size and properties of the ore, and/or the prevailing conditions in the furnace. To measure and control the temperature of exfoliation, I dispose a thermo-couple in the path of the discharging material adjacent the outlet of the furnace and connect the same to a conventional adjustable thermostat which is connected to the burner controls of the furnace to control the furnace automatically in such manner as to maintain the discharging material at the temperature at which the thermostat is set. Periodic determinations are made of the percent shrinkage of the exfoliated vermiculite, and when the shrinkage is greater or less than the given standard the thermostat is adjusted to increase or decrease, respectively, the control temperature, thereby to adjust the temperature of exfoliation to that which will produce exfoliated vermiculite having a given or standard percent shrinkage.

The process of the present invention as fully expressed thus resides in the steps of heating vermiculite ore to an exfoliating temperature, periodically determining the percent shrinkage of the exfoliated product, varying the degree of heat applied to the vermiculite for adjusting the temperature of exfoliation to that which will produce a product having a predetermined percent shrinkage, and normally maintaining the vermiculite ore being exfoliated at said adjusted temperature.

For control purposes, the relationship between the percent shrinkage of the exfoliated product and the temperature of exfoliation in the critical range is approximately as follows:

50% shrinkage at 800° F.
40% shrinkage at 1000° F.
30% shrinkage at 1200° F.
20% shrinkage at 1400° F.
10% shrinkage at 1600° F.
5% shrinkage at about 1700° F. or slightly higher.

In general, a decrease in the percent shrinkage of exfoliated vermiculite is a measure of increased dimensional stability of the product, and results in increased friability, marked increase in water and oil absorption before the vermiculite becomes a non-free flowing material, decreased drying time, decreased density, decreased surface area, and decreased chemical reactivity. Upon decrease in the percent shrinkage from 50% to 5% in exfoliated vermiculite having a particle size of from about −16 to about +100 mesh, the water absorption characteristic of the product in a free flowing state increases from about 65% to about 120%. The density decreases only slightly in this grade, from about 8.6 lbs. per cubic foot to about 8.3 lbs. per cubic foot, whereas in larger sizes or coarser grades the decrease is more marked. For example, in exfoliated vermiculite having a particle size of from about −4 to about +30 mesh, decrease in percent shrinkage over the aforesaid range results in a density change from about 7.3 lbs. per cubic foot to about 6.0 lbs. per cubic foot. In both grades, surface acidity is eliminated and surface area is decreased to a minimum when the percent shrinkage is 20 percent or lower.

To determine percent shrinkage, it is only necessary to thoroughly wet a measured volume of the exfoliated vermiculite, then thoroughly dry the vermiculite, repeating the wetting and drying if deemed necessary, and thereafter measure the volume of the vermiculite thus wet and dried. Water is the liquid preferred for wetting the vermiculite although other liquids, such as alcohol, may be used. The difference in volume before and after wetting and drying divided by the original volume is the percent shrinkage. Also, the percent shrinkage may be determined by comparing the densities shrunk (wet and dried) and unshrunk specimens of the exfoliated product, since density bears a direct relation to volume according to its definition density equals mass divided by volume. To determine the control factor, i.e., the percent shrinkage, rapidly and conveniently on a commercial basis, John Wiard and I have conceived of an improved determinative process which is disclosed in our copending application, Serial No. 633,240, filed January 9, 1957, now abandoned. Volume comparison or measurement, by which I mean direct determination of the difference in volume of a specimen before and after at least one wetting and drying cycle, appears at present to be well suited to manual determination of percent shrinkage, whereas density comparison would appear to be particularly advantageous for a fully automatic exfoliation control system, although either form of comparison may be used for either automatic or manual determinations. By determining the percent shrinkage at periodic intervals and controlling exfoliation in accordance therewith, each grade or size of vermiculite can be processed according to any one of a number of standards from high shrinkage to low shrinkage to afford a product especially suited for its intended purposes. Also, this basis of control evaluates the total effect of all variables in the exfoliation process and gives an immediate indication of change in the product regardless of the cause thereof. It is, therefore, an ideal quality control by means of which the product produced from time to time according to a given standard is always of a consistent quality and character. In addition, on the job determination or measurement of percent shrinkage is an ideal method of determining the characteristics of a given batch, bag, or carload or exfoliated vermiculite prior to its being put to a given use to determine or check its suitability for the particular use. Such spot determinations would be of particular benefit in the event identifying markings applied at the exfoliating plant were lost, mutilated, or tampered with during transit of the product, since the percent shrinkage is a substantially exact criterion of the other characteristics of the product.

As to particular products, I discovered, perhaps as a starting point of this invention, that high exfoliation temperatures result in a highly stable product, particularly in terms of dimensional stability. Exfoliated vermiculite has previously been proposed for use as a soil conditioner and a plant propagating medium. For these uses, as with others, the object of the art was to provide a strong, stable product and exfoliation was therefore carried out at the lowest practical furnace temperature to impart a low degree of friability and a high density to the product. When used as a plant propagating medium, in which use the product is periodically wet or soaked, the vermiculite exfoliated at low temperature suffered an extreme degree of shrinkage (50% and higher), which was a particularly disadvantageous characteristic. In accordance with my basic concept, I discovered that vermiculite exfoliated at high temperature had a lower percent of shrinkage than vermiculite processed at low temperature. While friability increases to some extent, this is not a critical factor and is fully offset by the provision of a substantially non-shrinking product. On the basis of tests that I have conducted, a satisfactory, substantially non-shrinking agricultural vermiculite may be consistently produced by the exfoliation of ore at a temperature to produce exfoliated vermiculite having a shrinkage of 0 to about 25%, the preferred range for commercial applications being 10 to 20%. The grade of vermiculite for this purpose has particles of a size from about −4 to about +30 mesh, and the actual temperature of exfoliation has a threshhold value of about 1300° F., and is preferably in the range of approximately 1400 to 1600° F. The density of the product is preferably about 5 to 6 lbs. per cubic foot, but density is not a controlling factor. For example, vermiculite exfoliated at 50% percent shrinkage has a density of almost 7 lbs. per cubic foot. If this exfoliated vermiculite were reheated to about 1400 to 1600° F., the percent shrinkage would decrease to about 10 to 20 percent, but the density would remain about 7 lbs. per cubic foot. In view of this fact, it is surmised that the percent shrinkage characteristic of vermiculite may be a function of the degree or character of crystallization of silicates in the vermiculite. However, for the actual exfoliation process, percent shrinkage is an accurate indicator of the characteristics of the product being exfoliated. In addition, as the vermiculite being exfoliated enters the preferred range of shrinkage and approaches complete exfoliation, the color of the vermiculite usually changes from gray to pink, so that the agricultural product of the invention may to a certain extent be identified by its color and size.

A second improved product, and/or a further improved characteristic of the above described agricultural vermiculite, is produced by exfoliation at a temperature to afford a shrinkage of less than 20 percent in the product. As previously observed, exfoliated vermiculite having a shrinkage factor of less than 20 percent is not chemically reactive and its surface area is relatively small. This characteristic renders the material ideal as a carrier for chemicals and eliminates the need for inhibitors and the like usually employed on reactive carriers. The thousands of air pockets in each particle take up large quantities of chemicals, the percent by weight of absorption being in part apparent from the previously observed water absorption characteristics of exfoliated vermiculite having a low percent shrinkage. For general purposes, exfoliated vermiculite employed as a chemical carrier is preferably of a small size, particle size suitably being from about −16 to about +100 mesh. In agricultural uses, the particle size is preferably that previously indicated, namely −4 to +30 mesh, and the vermiculite may serve the dual functions of a soil conditioner or plant propagating medium and a carrier for plant nutrients and/or biocides. Since the percent absorption is large in the described product and the drying time is relatively short, it is observed that large quantities of chemicals should be released quite readily from the vermiculite, whereby biocides may readily be dispersed to perform their function and plant nutrients can easily be extracted from the vermiculite by the plant rootlets to nourish the plant in its formative growth.

A further particular product based on exfoliation of vermiculite in accordance with the process of the present invention is an improved plaster aggregate disclosed in the copending application of myself and Ronald F. Cotts, Serial No. 694,912, filed November 7, 1957, now abandoned.

While I have described what I regard to be the preferred steps and critical conditions of my improved process, and certain improved products as being preferred for given uses, it is to be appreciated that various changes, rearrangements and modifications may be made in the steps of the process and in the products and their uses without departing from the scope of the invention, as defined by the appended claims.

I claim:

1. A process of producing exfoliated vermiculite comprising the steps of continuously feeding vermiculite ore to a furnace, heating the ore to an exfoliating temperature in the furnace, discharging the exfoliated vermiculite in a stream from the furnace, maintaining the heat in the furnace at a degree to afford a predetermined temperature of the discharging stream, periodically determining the percent shrinkage of the vermiculite in the discharging stream by subjecting a specimen taken from the stream to at least one wetting and drying cycle, adjusting the heat in the furnace to a degree providing a predetermined percent shrinkage of the vermiculite in the discharging stream, and maintaining the heat in the furnace at said adjusted degree.

2. A process of producing substantially non-shrinking exfoliated vermiculite comprising the steps of exfoliating unexpanded vermiculite ore at a temperature in excess of about 1300° F., determining the percent shrinkage of the vermiculite being exfoliated by subjecting a specimen of the exfoliated product to at least one wetting and drying cycle, and adjusting the temperature of exfoliation upward in the event that shrinkage is more than 25% to produce vermiculite having a percent shrinkage of less than 25%.

3. A process of producing substantially non-shrinking non-reactive exfoliated vermiculite comprising the steps of exfoliating unexpanded vermiculite ore at a temperature in excess of 1400° F., measuring the percent shrinkage of the vermiculite being exfoliated by subjecting a specimen of the exfoliated product to at least one wetting and drying cycle, and adjusting the temperature of exfoliation upward in the event that shrinkage is more than 20% to produce vermiculite having a percent shrinkage of less than 20%.

References Cited in the file of this patent

UNITED STATES PATENTS

| | | |
|---|---|---|
| 1,950,829 | Thomson | Mar. 13, 1934 |
| 1,963,275 | Labus | June 19, 1934 |
| 2,030,239 | Byers | Feb. 11, 1936 |
| 2,402,474 | Van Dyck | June 18, 1946 |
| 2,791,496 | Rice | May 7, 1957 |